(12) United States Patent
Kim et al.

(10) Patent No.: US 7,042,462 B2
(45) Date of Patent: May 9, 2006

(54) PIXEL CACHE, 3D GRAPHICS ACCELERATOR USING THE SAME, AND METHOD THEREFOR

(75) Inventors: Jae-hyun Kim, Suwon-si (KR); Yong-je Kim, Yongin-si (KR); Tack-don Han, Seoul (KR); Woo-chan Park, Seoul (KR); Gil-hwan Lee, Seoul (KR); Il-san Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/731,434

(22) Filed: Dec. 10, 2003

(65) Prior Publication Data

US 2004/0246260 A1 Dec. 9, 2004

(30) Foreign Application Priority Data

Jan. 29, 2003 (KR) ............... 10-2003-0005921

(51) Int. Cl.
*G09G 5/36* (2006.01)
*G06T 15/40* (2006.01)
(52) U.S. Cl. .................. 345/557; 345/422; 345/545
(58) Field of Classification Search ........... 345/501, 345/502, 422, 421, 589, 591, 592, 582, 614, 345/505, 506, 530, 536, 544, 545, 552, 557, 345/558; 711/118, 129, 130
See application file for complete search history.

(56) References Cited

U.S. PATENT DOCUMENTS 6,791,558 B1 * 9/2004 Park et al. ............ 345/556
6,801,203 B1 * 10/2004 Hussain ................ 345/506

FOREIGN PATENT DOCUMENTS

KR 10-2004-0011918 A 2/2004

* cited by examiner

*Primary Examiner*—Kee M. Tung
(74) *Attorney, Agent, or Firm*—Sughrue Mion, PLLC

(57) ABSTRACT

An effective structure of a pixel cache for use in a three-dimensional (3D) graphics accelerator is provided. The pixel cache includes a z-data storage unit that reads z-data from a frame memory and provides the read z-data to a pixel rasterization pipeline; and a color data storage unit that in advance reads and stores color data from the frame memory at the same time when the z-data storage unit reads the z-data from the frame memory, and provides the color data to the pixel rasterization pipeline only when the result of predetermined z-test is determined to be a success in the pixel rasterization pipeline. Accordingly, the pixel cache structure enables only color data required to be read and stored in advance before processing of the color data, thereby preventing access latency, increasing the efficiency of a color cache, and reducing power consumption.

16 Claims, 4 Drawing Sheets

PIXEL CACHE, 3D GRAPHICS ACCELERATOR USING THE SAME, AND METHOD THEREFOR

This application claims the priority of Korean Patent Application No. 2003-5921 filed on 29 Jan. 2003, in the Korean Intellectual Property Office, the disclosure of which is incorporated herein in its entirety by reference.

BACKGROUND OF THE INVENTION

1. Field of the Invention

The present invention relates to three-dimensional (3D) graphics processing, and more particularly, to a 3D graphics accelerator, a pixel cache for the 3D graphics accelerator, and a method of accelerating 3D graphics.

2. Description of the Related Art

Three-dimensional (3D) graphics is a technique of depicting an object in a 3D space using three axes such as the height, width, and length of the object and then more realistically displaying the object on a two-dimensional (2D) monitor screen. A 3-D graphics accelerator is an apparatus that speeds up 3-D graphics and which works by receiving a geometric figure depicted using a shaping modeler, changing some parameters such as a camera angle or a light source of the geometric figure, and outputting an image (or arrangement of pixels) of the geometric figure corresponding to the changed parameters.

A series of processes performed by the 3D graphics accelerator is called a graphics pipeline. Even if a delay in only one of the processes included in the graphics pipeline is caused, the full speed of the pipeline decreases. The graphics pipeline includes a geometry processing and a rendering processing. The amount of computation in the geometry processing is proportional to the number of apexes of a polygon to be processed, whereas the amount of computation in the rendering processing is proportional to the number of pixels.

During a graphics processing on a high-definition monitor, an increase in the number of pixels requires an increase in the operating speed of a rendering engine that performs a rendering processing. To increase the rendering speed, there is a need of improving the internal structure of the rendering engine, or increasing the number of rendering engines and arranging the rendering engines in parallel.

However, it is most effective to reduce a frequency to access a memory, i.e., to reduce a memory bandwidth, in order to increase the processing speed of the rendering engine. To display an image on a 2D monitor screen, texture data and pixel data, which are stored in the memory, need to be processed. To reduce the frequency to access the memory, installation of a cache into a graphics accelerator is indispensable.

In general, a 3D-graphics rendering processor uses a pixel cache that stores depth-data, i.e., z-data, and color data. The hit ratio of the pixel cache is remarkably lower than that of a microprocessor cache. A high hit ratio of cache increases the probability of reusing data stored in the cache, thus reducing the frequency to access the memory. Accordingly, an effective structure of the pixel cache is required to increase the probability of the hit ratio of the pixel cache.

The performance of 3D-graphics hardware is strongly affected by the memory speed. Although the memory is dependent on factors such as data structure, memory structure, and frequency of accessing the memory, there is not much research on these topics. A recent paper by Mitra and Chiuh provides an analysis of a dynamic workload, in which the analysis is related only to use of texture traffics and memory banks during a rasterization process. In addition, techniques to solve problems caused by texture data dealt only with a texture cache or a texture first-in, first-out (FIFO) procedure. Moreover, research on a pixel cache is in an initial phase.

SUMMARY OF THE INVENTION

The present invention provides a pixel cache with a high hit-ratio structure, a three-dimensional (3D) graphics accelerator including the same, and a method of accelerating 3D graphics.

According to an aspect of the present invention, there is provided a pixel cache for a three-dimensional (3D) graphics accelerator, comprising a z-, data storage unit that reads z-data from a frame memory and provides the read z-data to a pixel rasterization pipeline; and a color data storage unit that in advance reads and stores color data from the frame memory at the same time when the z-data storage unit reads the z-data from the frame memory, and provides the color data to the pixel rasterization pipeline only when the result of predetermined z-test is determined to be a success in the pixel rasterization pipeline.

According to another aspect of the present invention, there is provided a 3D graphics accelerator comprising a z-cache that reads and stores z-data from frame memory; a color cache that in advance reads and stores color data from the frame memory at the same time when the z-cache reads the z-data from the frame memory; a z-test unit that reads the z-data from the z-cache and performs a predetermined z-test on the z-data; and a color processor that reads color data from the color cache and performs a predetermined coloring processing on the color data when the result of z-test is determined to be successful.

According to yet another aspect of the present invention, there is provided a method of accelerating 3D graphics, comprising: reading z-data from frame memory and storing the z-data in a z-cache; reading color data from the frame memory and storing the color data in a color cache; reading z-data from the z-cache and performing a predetermined z-test on the z-data; and reading the color data from the color cache and performing a predetermined coloring processing on the color data, when the result of z-test is determined to be a success.

The present invention suggests an effective structure for a pixel cache included in a 3D rendering processor. In the effective structure, color data is selectively loaded into a cache based on the result of a depth-test, i.e., z-test, performed by the 3D rendering processor. More specifically, data is read from a frame memory and stored in a small buffer with four or eight entries, i.e., a pixel buffer, and then, selectively loading is performed on the stored data. Data on which the z-test is satisfactorily completed is stored in the cache, and data on which the z-test is not satisfactorily completed is not stored in the cache. Accordingly, it is possible to store former data in a cache system for longer time than the time for storing latter data, thereby increasing the probability of reusing the data on which the z-test is satisfactorily performed.

BRIEF DESCRIPTION OF THE DRAWINGS

The above and other aspects and advantages of the present invention will become more apparent by describing in detail preferred embodiments thereof with reference to the attached drawings in which.

DETAILED DESCRIPTION OF THE INVENTION

Hereinafter, the structure of a pixel cache for use in a three-dimensional (3D) graphics accelerator, according to a preferred embodiment of the present invention, will be described in detail with reference to the accompanying drawings.

Figure 1:
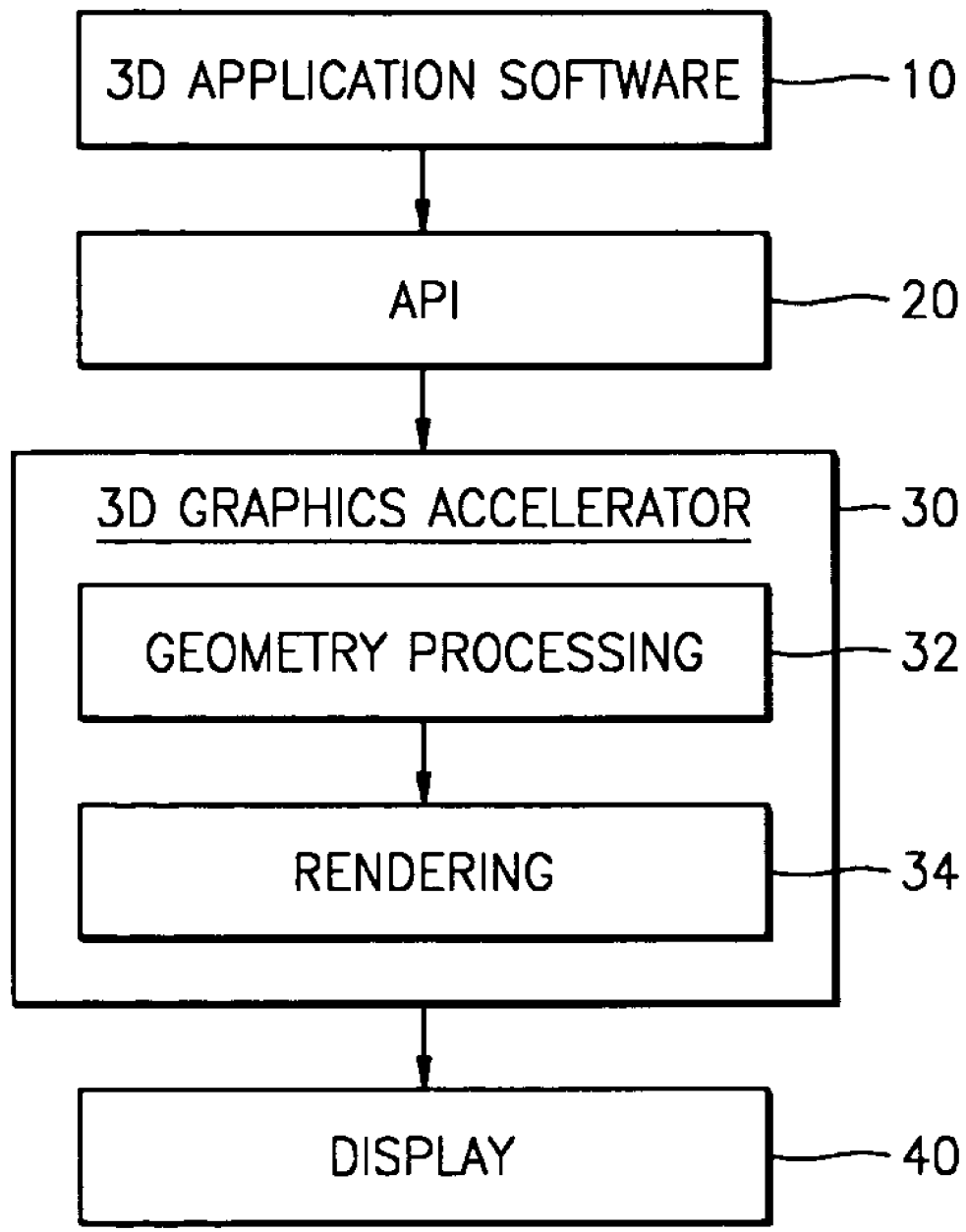
FIG. 1 is a block diagram illustrating a method of processing three-dimensional (3D) graphics.

FIG. 1 is a block diagram illustrating a method of processing 3D graphics. Referring to FIG. 1, 3D application software 10 sends 3D graphics data to an application program interface (API) 20. Next, a 3D graphics accelerator 30 receives the 3D graphics data from the API 20, performs real-time hardware acceleration on the 3D graphics data, and transmits the result to a display 40. In general, the 3D graphics accelerator 30 performs a geometric processing 32 and a rendering 34. In the geometry processing 32, an object with 3D coordinates is transformed with respect to different points of view to be projected as an object with 2D coordinates. In the rendering 34, color value of an image with 2D coordinates is determined and stored in a frame buffer. After processing of all of 3D data input with respect to a frame, the color value stored in the frame buffer is transmitted to the display 40.

In general, a 3D graphics image consists of dots, lines, and polygons, and a 3D rendering processor is constructed such that triangles can be processed at high speeds. The rendering processor is pipelined to increase the processing speed thereof, and includes a triangle-setup processor, an edge-walk processor, and a pixel rasterization processor.

The triangle setup processor computes values of an input triangle, the values being used by the edge-walk processor and the pixel rasterization processor. The edge-walk processor measures starting and ending points of a span along the edges of the triangle. Here, the starting and ending points of the span are two intersecting points made when a given scan line meets the edges of the triangle, and the span is a set of pixels located between the starting and ending points. The pixel rasterization processor produces a final color value of pixels constituting the span by performing interpolation on the span.

Figure 2:
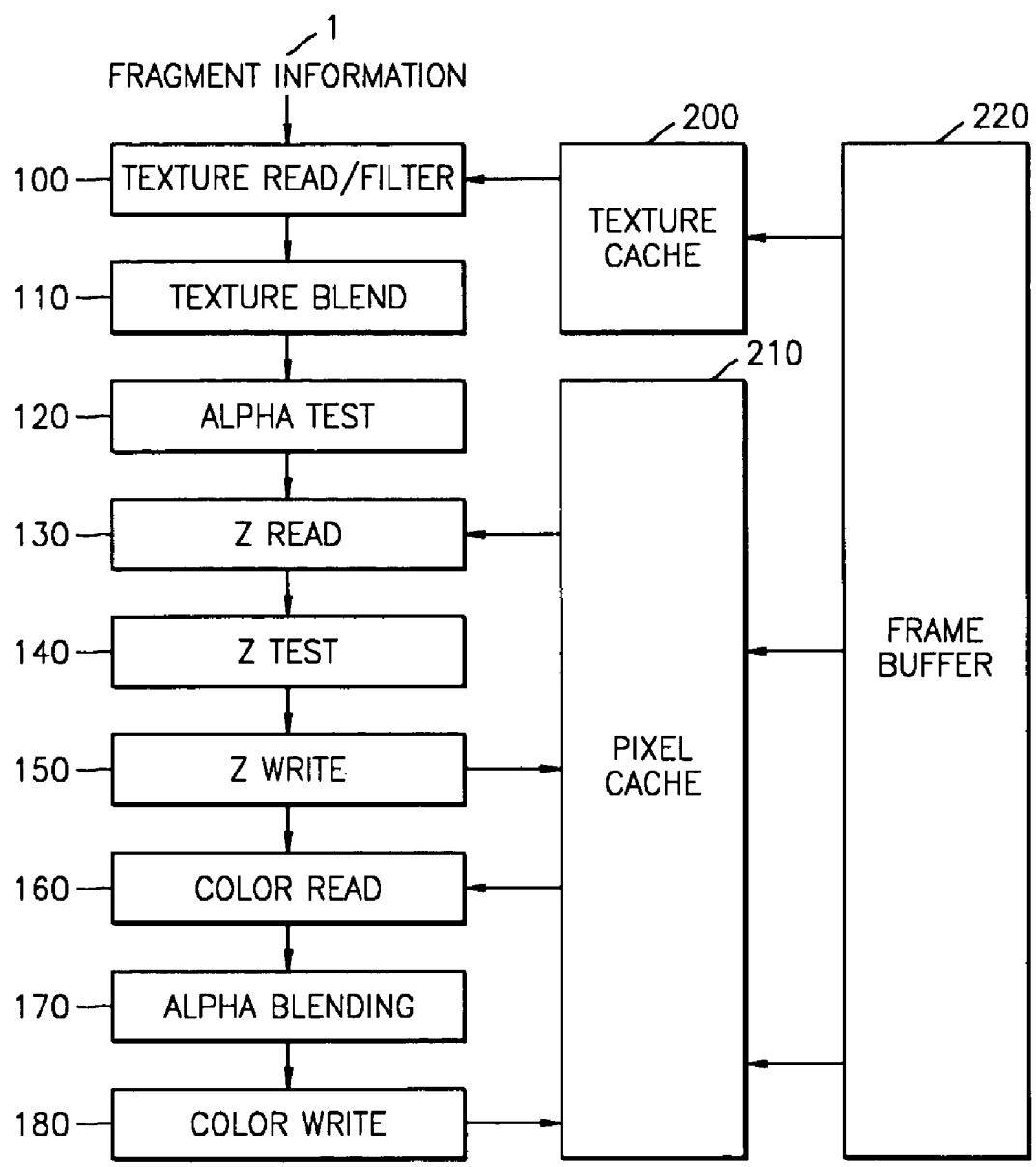
FIG. 2 is a block diagram illustrating the structure of a conventional pixel rasterization pipeline.

FIG. 2 is a block diagram illustrating the structure of a general pixel rasterization pipeline. For convenience, a texture cache 200, a pixel cache 210, and external memory 220, which is installed outside a 3D graphics accelerator, are further illustrated in FIG. 2.

Referring to FIG. 2, fragment information 1 contains a color value produced using interpolation, 3D coordinates (x, y, z), texture coordinates, and so on. In step 100, four or eight texels are read from the texture cache 200 with respect to related texture coordinates and filtering is performed on the four or eight texels to obtain a texel, which is the most basic element of texture data. In step 110, the obtained texel is blended with the color value contained in the input fragment information 1, i.e., text blending is performed in step 110. In step 120, an alpha value contained in the fragment information 1 and an alpha value of the filtered texel are tested. Here, the alpha value denotes transparency. If the result of test is satisfactory, a next step is performed. Otherwise, the fragment information 1 is discarded.

In step 130, a read operation of reading a z-value from the pixel cache 210 is performed, i.e., z-read is performed. In step 140, the read z-value is compared with a z-value of a current fragment, i.e., z-test is performed. During the z-test, it is checked whether the current fragment is hidden by a previously processed image or not. If the current fragment is hidden, the result of z-test is treated as a failure. In this case, the current fragment is discarded from the pipeline. In step 150, if the current fragment is not hidden by the previously processed image, the z-value of the current fragment is written to the pixel cache 210.

In step 160, a read operation of reading a color value from the pixel cache 210 is performed. In step 170, alpha blending is performed on the color value read from the pixel cache 210 and a color value obtained by the texture blending in step 110. In step 180, the result of alpha blending is stored in the pixel cache 210.

During the rasterization, a greater amount of data stored in memory is transmitted during transmission of texture pixels in a processing pipeline process and during an access to the frame buffer memory 220. Texture data is used to give an image a more realistic, visually texturizing effect and is generally made in a bitmap format. In most cases, a texel, which is the most basic element of the texture data, and a pixel, which is the most basic element of a polygon displayed on a screen, are different in their sizes. To solve this problem, a mip-map technique is used. In the mip-map technique, the values of textures of different levels of detail (LOD) are predetermined for fast mapping of texture, eight texels are read to measure the value of a representative texel during executing a program, tri-linear interpolation is performed on these eight texels, and the result of tri-linear interpolation is used as the representative texel value. It is possible to make the sizes of the texel and the pixel be the same using the mip-map technique known to be faster than filtering. However, the mip-map technique requires reading eight texels from memory for real-time mipmapping, thus resulting in an increase in the amount of transmission of data stored in memory.

A memory traffic caused by an access to the frame buffer 220 occurs mainly during the z-test, i.e., depth test. The z-test is to compare the depth of a pixel, i.e., the current pixel, which is currently processed, with that of a pixel, i.e., the previous pixel which has already been processed. The current pixel can be seen on a screen when the current pixel is located before the previous pixel, whereas the current pixel is hidden on the screen and thus is discarded when the current pixel is located after the previous pixel. During the z-test, the availability of the current pixel is determined based on the depth information regarding the previous pixel stored in a z-buffer, and read and write operations are performed. If the current pixel is determined to be available according to the result of z-test, an alpha test is performed on the current pixel to obtain the depth information regarding the current pixel and the depth information regarding the previous pixel stored in the z-buffer is updated with the obtained depth information. If the current pixel is transparent, the depth information stored in the z-buffer is updated with the depth information obtained by the alpha test, the current pixel is blended with a pixel stored in a color buffer to obtain a new color pixel referring to the color information regarding the pixel stored in the color buffer, and the color information stored in the color buffer is updated with the color information regarding the new color pixel. During updating, read and write operations are performed in the frame buffer 220 so as to compute pixel information. Therefore, a memory bandwidth and access latency become major factors that affect the performance of the frame buffer 220. In general, 3D graphics accelerators use a cache memory to reduce the transmission amounts of texture and data written to the frame buffer 220. The use of the cache memory reduces the memory bandwidth and the access latency to great extents. If the resolution of a screen becomes higher, the number of pixels to be processed is increased and the amounts of transmission of data stored in texture memory and the frame buffer 220 are also increased by geometric progression.

To solve these problems, the present invention suggests a low-power pixel cache structure that is appropriate for high-performance 3D graphics hardware and mobile appliances.

Figure 3:
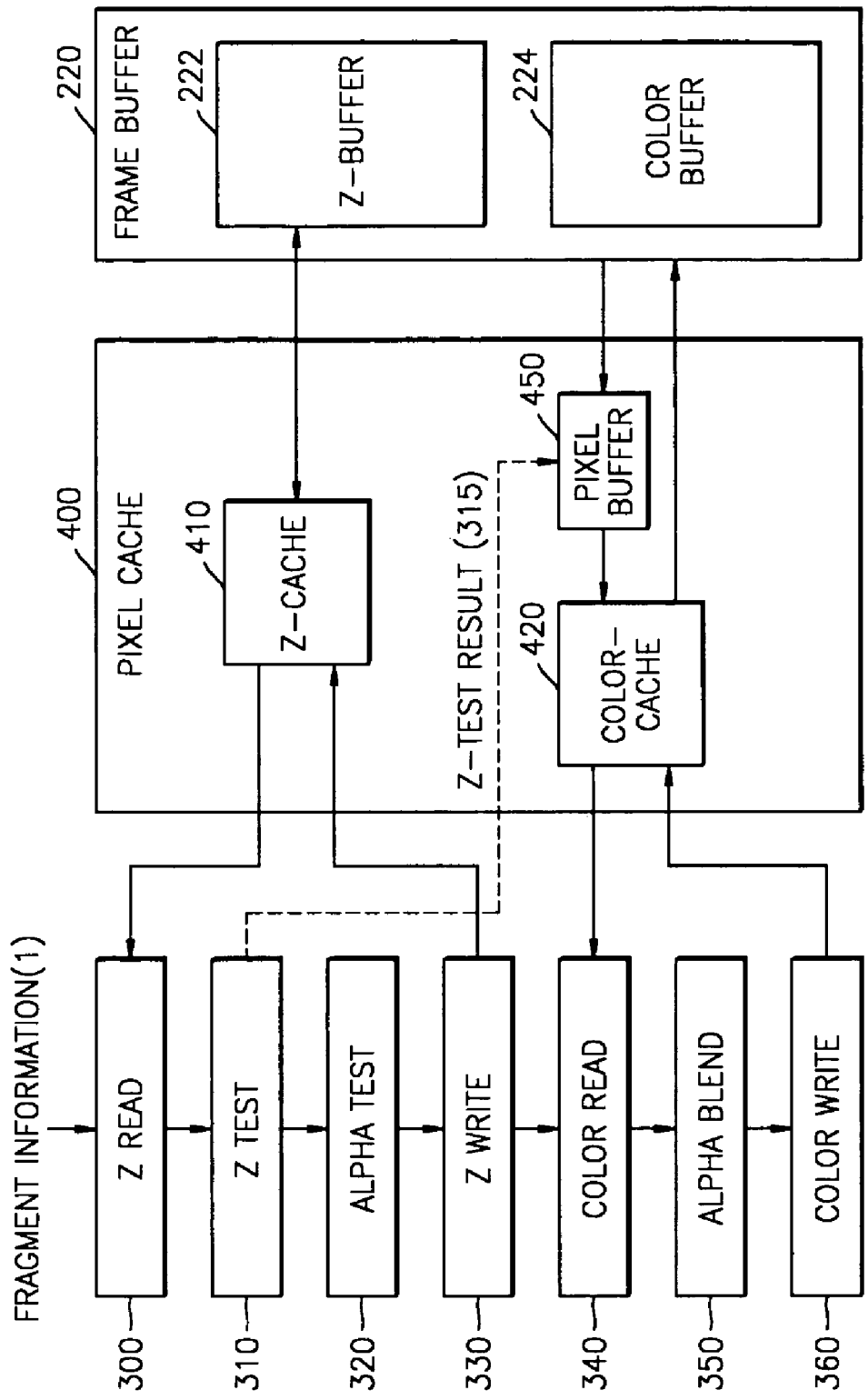
FIG. 3 is a block diagram illustrating the structure of a pixel cache according to a preferred embodiment of the present invention.

FIG. 3 is a block diagram illustrating the structure of a pixel cache 400 according to a preferred embodiment of the present invention. The pixel cache 400 for use in a 3D graphics accelerator, according to the present invention, separately stores z-data and color data to increase cache efficiency. The pixel cache 400 includes a z-data storage unit (or z-cache) 410 and a color data storage unit (color cache) 420.

The z-data storage unit 410 reads z-data from a z-buffer 222 built in a frame memory 220 and provides the read z-data to a pixel rasterization pipeline.

The color data storage unit 420, in advance, reads color data from a color buffer 224 built in the frame memory 220 and stores the read color data, at the same time the z-data storage unit 410 reads the z-data from the frame memory 220. The operation of the color data storage unit 420 is called prefetch. The color data storage unit 420 performs the z-test in the pixel rasterization pipeline, and provides the stored color data to the pixel rasterization pipeline when color data is actually required. In the pixel cache structure according to the present invention, the result of z-test is used during processing of the color data, thereby increasing cache efficiency.

More preferably, only color data to be actually used is stored in the color data storage unit 420 to reduce power consumption. For this reason, a small-sized color pixel buffer 450 with four or eight entries, as shown in FIG. 3, is installed inside the pixel cache 400. The color pixel buffer 450 reads in advance the color data from the frame memory 220 and stores the read color data. Only when the result of z-test in the pixel rasterization pipeline is a success, the color data is stored in the color data storage unit 420.

Figure 4:
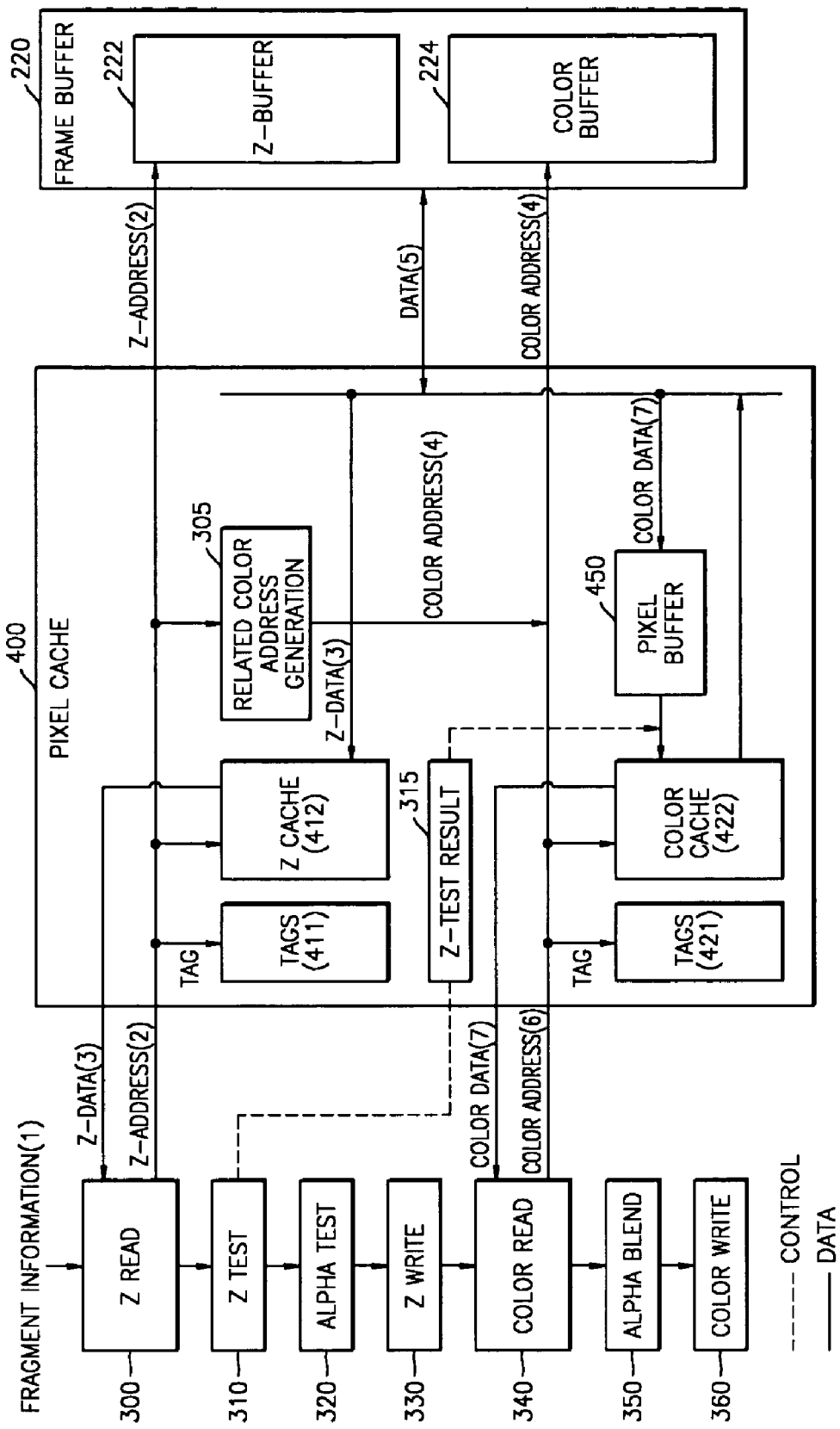
FIG. 4 is a block diagram illustrating the operations of and the flow of signals in a 3D graphics accelerator according to a preferred embodiment of the present invention.

FIG. 4 is a block diagram illustrating the operations of and the flow of signals in a 3D graphics accelerator, according to a preferred embodiment of the present invention. The 3D graphics accelerator and a method of accelerating 3D graphics, according to preferred embodiments of the present invention, will now be described in detail with reference to FIG. 4.

Referring to FIG. 4, in step 300, reading of z-data 3 is performed. To read the z-data 3, an address 2 of z-data 3 is sent to a pixel cache 400 and the pixel cache 400 detects the z-data 3 from its inside. If the z-data 3 is not detected from a z-cache 412, the pixel cache 400 reads the z-data 3 from a z-buffer 222 built in a frame buffer 220 and stores the read z-data in a z-cache 412. At the same time, a color value corresponding to a pixel position of the z-data 3 is prefetched from a color buffer 224 included in the frame buffer 220 and the color value is stored in a color pixel buffer 450. To prefetch the color value, a color address 4 of color data in the memory is produced and provided to the frame buffer 220.

In step 310, a z-test is performed in a pixel rasterization pipeline. The result of z-test is considered successful when a pixel being currently processed in the rasterization pipeline during the z-test is displayed on a screen, whereas the result of z-test is considered not successful when the pixel is hidden by a previously processed pixel. In step 315, the result of z-test is sent to the pixel cache 400.

If the result of z-test is determined to be not successful, color data 7 stored in the pixel buffer 450 is discarded. Then, the 3D graphics accelerator performs a color rasterization pipeline on a next pixel fragment.

If the result of z-test is determined to be successful, the color data 7 stored in the pixel buffer 450 is stored in a color cache 422. Then, the processes of the color rasterization pipeline are performed in a regular succession without intermission. Thus, in step 340, the stored color data 7 can be directly read and used without access latency.

A pixel cache structure according to the present invention is advantageous in that (i) color data required is read in advance, i.e., it is prefetched, to be immediately read in step 340, thereby preventing access latency; (ii) only color data required is stored in the color cache 422 based on the result of z-test, thereby increasing the efficiency of the color cache 422; and (iii) power consumption is reduced by decreasing the amount of information stored in the pixel cache 400.

While this invention has been particularly shown and described with reference to preferred embodiments thereof, it will be understood by those skilled in the art that various changes in form and details may be made therein without departing from the spirit and scope of the invention as defined by the appended claims.

A pixel cache, a 3D graphics accelerator using the same, and a method of accelerating 3D graphics, according to the present invention, enables only color data required to be read and stored in advance. Accordingly, it is possible to prevent access latency, increase the efficiency of a color cache, and reduce power consumption.

What is claimed is:

1. A pixel cache for a three-dimensional (3D) graphics accelerator, comprising:
   a z-data storage unit that reads z-data from a frame memory and provides the read z-data to a pixel rasterization pipeline; and
   a color data storage unit that in advance reads and stores color data from the frame memory at the same time when the z-data storage unit reads the z-data from the frame memory, and provides the color data to the pixel rasterization pipeline only when the result of predetermined z-test is determined to be a success in the pixel rasterization pipeline.

2. The pixel cache of claim 1, further comprising a color pixel buffer that reads in advance the color data from the frame memory and stores the color data in the color data storage unit only when the result of z-test is determined to be a success in the pixel rasterization pipeline.

3. The pixel cache of claim 2, wherein the color pixel buffer includes four or eight entries.

4. The pixel cache of claim 1, wherein the result of z-test is determined to be successful when a pixel that is being rasterized is displayed on a screen, and determined to be not successful when the pixel is hidden on the screen.

5. The pixel cache of claim 1, wherein the z-data storage unit reads z-data required from the frame memory only when the z-data required is not stored in the z-data storage unit.

6. A 3D graphics accelerator comprising:
a z-cache that reads and stores z-data from frame memory;
a color cache that in advance reads and stores color data from the frame memory at the same time when the z-cache reads the z-data from the frame memory;
a z-test unit that reads the z-data from the z-cache and performs a predetermined z-test on the z-data; and
a color processor that reads color data from the color cache and performs a predetermined coloring processing on the color data when the result of z-test is determined to be successful.

7. The 3D graphics accelerator of claim 6, further comprising a color pixel buffer that in advance reads and stores color data from the frame memory, and stores the color data in the color cache only when the result of z-test is determined to be successful.

8. The 3D graphics accelerator of claim 7, wherein the color pixel buffer includes four or eight entries.

9. The 3D graphics accelerator of claim 6, wherein the result of z-test is determined to be successful when a pixel that is being rasterized is displayed on a screen, and determined to be not successful otherwise.

10. The 3D graphics accelerator of claim 6, wherein the z-cache reads z-data required from the frame memory only when the z-data required is not stored in the z-cache.

11. A method of accelerating 3D graphics, comprising:
reading z-data from frame memory and storing the z-data in a z-cache;
in advance reading color data from the frame memory and storing the color data in a color cache at the same time when the z-cache reads the z-data from the frame memory;
reading z-data from the z-cache and performing a predetermined z-test on the z-data; and
reading the color data from the color cache and performing a predetermined coloring processing on the color data, when the result of z-test is determined to be a success.

12. The method of claim 11, wherein the result of z-test is determined to be successful when a pixel that is being rasterized is displayed on a screen, and determined to be not successful otherwise.

13. The method of claim 11, wherein z-data required is read from the frame memory only when the z-data required is not stored in the z-cache.

14. A method of accelerating 3D graphics, comprising:
reading z-data from frame memory and storing the z-data in a z-cache;
in advance reading color data from the frame memory and storing the color data in a color pixel buffer at the same time when the z-cache reads the z-data from the frame memory;
reading z-data from the z-cache and performing a predetermined z-test on the z-data;
storing the color data, which is stored in the color pixel buffer, in a color cache when the result of z-test is determined to be a success; and
reading the color data from the color cache and performing a predetermined coloring processing on the color data, when the result of z-test is determined to be a success.

15. The method of claim 14, wherein the result of z-test is determined to be successful when a pixel that is being rasterized is displayed on a screen, and determined to be not successful otherwise.

16. The method of claim 14, wherein during reading z-data from frame memory and storing the z-data in a z-cache, z-data required is read from the frame memory only when the z-data required is not stored in the z-cache.

* * * * *